UNITED STATES PATENT OFFICE.

FRANZ WILHÖFT, OF NEW YORK, N. Y.

METHOD OF MANUFACTURING NON-BLOOMING VULCANIZED SOFT RUBBER.

SPECIFICATION forming part of Letters Patent No. 375,405, dated December 27, 1887.

Application filed May 13, 1887. Serial No. 238,023. (No specimens.)

*To all whom it may concern:*

Be it known that I, FRANZ WILHÖFT, of the city of New York, county and State of New York, have invented a new Method of Manufacturing Non-Blooming Vulcanized Soft Rubber Under the Low Heat of Vulcanization Generally Used by Rubber Factories, of which the following is a specification.

On the 30th of June, 1885, the United States granted me Letters Patent, No. 321,410, for the invention of manufacturing vulcanized soft rubber in which all sulphur was chemically combined with the rubber, and therefore could not throw out sulphur (bloom) to the surface. According to the specification this result was reached by subjecting the rubber, mixed with sulphur, to an extreme heat never before used in vulcanizing soft rubber. In practice, however, it was soon found that the very expensive boilers and vulcanizers required to produce and stand this enormous heat, necessitating a complete change of all heating apparatus in existing factories, was an unsurmountable obstacle to the general introduction of my method. Since then I have succeeded in manufacturing non-blooming vulcanized soft rubber under the ordinary degree of heat now used in our factories, and my present process can be executed by any rubber-factory without changing their heating apparatus.

The following is a specification of this improved method: Pure sulphur mixed with india-rubber will, by the usual mode of vulcanization, combine with one another, but the former will continue to effloresce from the moment it leaves the vulcanizer. This efflorescence of sulphur (bloom) is nothing else than a process of crystallization. To prevent this the sulphur must be rendered amorphous. This can be done by subjecting the sulphurous rubber mass to a heat above 330° Fahrenheit in vulcanizing, (see my Patent No. 321,410,) or, preferably, by using a sulphur preparation or sulphur compound in which the sulphur is already in a lasting amorphous condition. When this is used instead of sulphur, the ordinary low heat of 270° to 280° Fahrenheit, equal to about thirty to thirty-five pounds steam-pressure to the square inch in the vulcanizer, is sufficient to chemically combine sulphur and rubber and prevent blooming. Sulphur may be rendered lastingly amorphous by fusing it with any fatty, greasy, resinous, and turpentine-like body by the aid of heat under certain conditions. This means that the sulphur must be heated to such a degree that it becomes brown, or so thick or tar-like that it would not flow from the vessel when upset. This renders the sulphur amorphous temporarily—that is, not lastingly. Now the greasy, fatty, resinous, or turpentine-like body is gradually added to it under continuous stirring of the mass until samples of the hot mass, upon cooling, show no symptom of crystallization. This is done for the purpose of rendering the sulphur lastingly amorphous. When this point has been reached, the mass is poured out and, after cooling, broken up and ground. This preparation should have the color of moist clay, and is of a pungent sulphurous odor. The proportion of sulphur and of the greasy, fatty, resinous, or turpentine-like bodies differs, as a matter of course, and I use at present to one pound of sulphur one-fourth of a pound of Canada balsam, although equal quantities might be used.

The quantity of sulphur compound to be used for vulcanization depends upon the proportion of sulphur the compound contains. In my case I use from six to seven per cent. of the weight of the rubber.

The fusing of the sulphur with the greasy, fatty, resinous, and turpentine-like bodies causes the sulphur to assume a lastingly-amorphous condition—that is to say, the sulphur, which had previously a tendency to crystallize, has now lost such tendency and can therefore not effloresce.

What I claim is—

1. A compound consisting of amorphous sulphur and of a greasy, fatty, resinous, or turpentine-like body, and adapted to be used for the manufacture of non-blooming soft rubber, substantially as specified.

2. The process of making a preparation of sulphur in which this body is in a lasting amorphous condition, which consists in fusing sulphur with a greasy, fatty, resinous, or turpentine-like body, substantially as specified.

3. The process of manufacturing non-blooming vulcanized soft rubber, which consists in mixing rubber with a sulphur preparation in which this body is in a lastingly-amorphous condition by the addition of a greasy, fatty, resinous, or turpentine-like body and vulcanizing the mixture, substantially as specified.

FRANZ WILHÖFT.

Witnesses:
HENRY E. ROEDER,
F. V. BRIESEN.